(12) United States Patent
Nomoto (10) Patent No.: US 7,013,386 B2
(45) Date of Patent: Mar. 14, 2006

(54) METHOD AND DEVICE FOR MAKING A PRINT OF A DIGITAL IMAGE AND METHOD OF MANAGING DIGITAL DATA

(75) Inventor: Tetsushi Nomoto, Yokohama (JP)

(73) Assignees: Nikon Corporation, Tokyo (JP); Nikon Technologies Inc., Tokyo (JP)

( * ) Notice: Subject to any disclaimer, the term of this patent is extended or adjusted under 35 U.S.C. 154(b) by 821 days.

(21) Appl. No.: 09/865,572

(22) Filed: May 29, 2001

(65) Prior Publication Data

US 2001/0049784 A1 Dec. 6, 2001

(30) Foreign Application Priority Data

Jun. 1, 2000 (JP) ............................. 2000-164062

(51) Int. Cl.
*G06F 17/00* (2006.01)

(52) U.S. Cl. ..................... 713/153; 713/150; 713/152

(58) Field of Classification Search ................ 713/153, 713/150, 152; 709/203; 711/216; 707/1
See application file for complete search history.

(56) References Cited

U.S. PATENT DOCUMENTS

| | | | | |
|---|---|---|---|---|
| 3,668,647 A | * | 6/1972 | Evangelisti et al. ............ | 707/1 |
| 4,642,684 A | * | 2/1987 | Alkofer ........................ | 358/522 |
| 5,580,177 A | * | 12/1996 | Gase et al. .................... | 400/61 |
| 5,694,569 A | * | 12/1997 | Fischer ........................ | 711/216 |
| 6,184,996 B1 | * | 2/2001 | Gase .......................... | 358/1.15 |
| 2002/0165911 A1 | * | 11/2002 | Gabber et al. ............... | 709/203 |

FOREIGN PATENT DOCUMENTS

| | | | |
|---|---|---|---|
| EP | 654920 A2 | * | 5/1995 |
| EP | 886206 A2 | * | 12/1998 |
| JP | A 2000-180991 | | 6/2000 |

OTHER PUBLICATIONS

"Windows 98 Professional Reference" Chapters 13, 17, 27, Mar. 1, 2000, [Retrieved from Internet Nov. 17, 2004], "http://cma.zdnet.com/book/win98prfref/index.htm".*
Visual cryptography for print and scan applications; Wei-Qi Yan; Duo Jin; Knakanhalli, M.S.; Circuits and Systems, 2004. ISCAS'04. Proceedings of the 2004 International Symposium on vol. 5, May 23-26, 2004 Page(s):V-572-V-575 vol. 5.*
FaceCerts; Kirovski, D.; Jojic, N.; Data Compression Conference, 2003. Proceedings. DCC 2003 Mar. 25-27, 2003 Page(s):435.*
Analysis of an electronic voting system; Kohno, T.; Stubblefield, A.; Rubin, A.D.; Wallach, D.S.; Security and Privacy, 2004. Proceedings. 2004 IEEE Symposium on May 9-12, 2004 Page(s):27-40.*

* cited by examiner

*Primary Examiner*—David Jung
(74) *Attorney, Agent, or Firm*—Oliff & Berridge PLC (57) ABSTRACT

In a system for making a print of a digital image including a computer for storing a digital image data and a printing device for making the print of the digital image data, a method comprises a step of transmitting from the computer to the printing device the digital image data along with information indicative of a location of the digital image data in the computer, a step of making at the printing device the print based on the transmitted digital image data, and a step of adding at the printing device the transmitted information to the print.

11 Claims, 12 Drawing Sheets c:photo ———————— 100NIKON ——————— DISCN0001.JPG

———— DISCN0002.JPG

———— DISCN0003.JPG

———— DISCN0011.JPG

```
file name;DSCN0001.JPG

NEW;19990412
dir;c:¥photo¥100NIKON          — 91

Send;19990412                  — 92

New dir;19990826
c:¥photo¥nyugaku¥100NIKON      — 93

New dir;199901103
c:¥photo¥asako¥nyugaku¥100NIKON — 94
```

FIG. 9A

```
file name;DSCN0011.JPG

NEW;19990505
vol.label;kodomo
dir;a:¥100NIKON                — 95

Send;19990505                  — 96

New dir;199901010
c:¥photo¥kodomo¥100NIKON       — 97

Delete;20000331                — 98
```

METHOD AND DEVICE FOR MAKING A PRINT OF A DIGITAL IMAGE AND METHOD OF MANAGING DIGITAL DATA

This application is based upon and claims priority of Japan Patent Application No. 2000-164062 filed on Jun. 1, 2000, the contents being incorporated herein by reference.

BACKGROUND OF THE INVENTION

1. Field of the Invention

The present invention relates to a method and devices for making a print and method for managing image data, and more particularly, to a method and a device for ordering an additional image print and to a method for managing digital image data for used in ordering an additional print.

2. Description of Related Art

Digital photographs are spreading with increasing digital still cameras (DSC). Digital images can be viewed on display devices such as CRTs of television sets or of personal computers. But many digital images are also viewed in the form of prints like conventional silver-halide photographic prints.

In order to obtain a digital image print, two ways are generally used. One way is to use user's personal computer and printer connected each other. The personal computer reads a digital image and controls the printer to make a print. Another way is to use a print service laboratory that offers a service to print a picture for a customer. The print service laboratory makes a digital image print with the same quality of a silver-halide photographic picture, using a high-performance digital printer. This digital image print processed by the print service laboratory has higher quality than that of the print processed by the common digital printer.

When a customer orders a print to the print service laboratory, the customer has to provides image data of a digital image to the service laboratory by using either of the following two methods. One method is to provide the print service laboratory with a recording medium in which digital images to be printed are stored. Another method is to transmit image data to a server computer of the print service laboratory from user's computer through a communication system such as the Internet.

Image data of a digital image captured by a DSC is stored in a storage device such as hard disk of a computer. The stored image data is used as necessary. For example, the stored image data is retrieved from the hard disk when a customer orders an additional print. Meanwhile, it is possible to use a dedicated product for storing and viewing images instead of a personal computer, which dedicated product has a large capacity of storage device. It is also possible to store the image data into a storage medium for used with a detachable storage device such as an optical disk drive device or a CD-R device.

The personal computer and dedicated device have a search function for searching image data stored in its storage device. Keyword searching is performed using keywords such as a date of photography, a date of image storage, and a title of an image.

It is not so easy to search and retrieve a desired image from the storage devices or the storage media storing large number of digital images. If considerable time passes after images have been created and stored, it is difficult to assign an adequate keyword to the image because a customer cannot clearly remind the date when he took a picture or stored into the storage device or the storage media.

If a customer wants to search an image stored in his personal computer based upon an image title, it is necessary for him to give each image the image title in advance, spending considerable time and effort. However, after considerable time has passed, even the user who named the image title tends to forget the image title. If other person who does not know the image title searches the image based upon a keyword, it is more difficult to search the image because of difficulty in designating a right keyword to the image.

SUMMARY OF THE INVENTION

An object of the present invention is to provide a method and device for facilitating an easy retrieval of digital image data which has been once used upon making a print, the method and device being for ordering and making a print.

Another object of the present invention is to provide an improved data managing method used in a database of digital data as digital image data.

According to one aspect of the present invention to achieve the objects descried above, a system for making a print of a digital image is improved, the system including a computer for storing a digital image data and a printing device for making the print of the digital image data. The improvement is a method comprising the steps of transmitting from the computer to the printing device the digital image data along with information indicative of a location of the digital image data in the computer, making at the printing device the print based on the transmitted digital image data and adding at the printing device the transmitted information to the print.

By means of the improvement, the digital image data of the print can be easily located.

In one preferred embodiment of the present invention, the computer includes a file system with directory information, wherein the information includes specific directory information related to the transmitted digital image data.

According to another aspect of the present invention, the computer is of a customer who orders the print of the digital image, the printing device making the print in response to the order from the computer, wherein the method further comprises a step of delivering the print to the customer.

The customer easily makes an order again of a print of the same digital image data.

In one preferred embodiment of the present invention, the digital image data and the information are transmitted from the computer to the printing device through a telecommunication system upon the order.

In one preferred embodiment of the present invention, the step of adding the information includes a step of encrypting the information, the encrypted information being added to the print. The method further comprises the steps of transmitting from the computer to the printing device the encrypted information added to the delivered print, decrypting the encrypted information at the printing device, and transmitting from the printing device to the computer the decrypted information.

Thus, the customer with the decrypted information can easily locate the digital image data in the computer to make an order for a further print of the digital image. On the other hand, the printing device that receives the query with the encrypted information can have more chances to get an order of additional print.

According to another aspect of the present invention, a method of managing digital data comprises a first step of storing a digital data at a location of a first database, a second step of recording in a second database a change in the location of the digital data in the first data base, a third step of designating the location of the digital data in the first database, a fourth step of consulting the second data base in response to the third step for knowing the current location of the digital data in the first database, and a fifth step of locating the digital data in the first data base in response to the fourth step.

Accordingly, even if a location of a digital image data in the first database is changed, it is easy to retrieve the digital image data based upon recorded information in the second database.

In one preferred embodiment of the present invention, the above method further comprises a sixth step of trying to locate the digital data in the first database in response to the third step, and a seventh step of making the fourth and fifth steps effective when the sixth step fails to locate the digital data because of the change in the location in the first database, wherein the fourth and fifth steps are made ineffective when the sixth step is successful on the other hand.

The features in the methods described above are also applicable to various devices disclosed in the present application, such as the computer or the printing device.

Other features and advantages according to the invention will be readily understood from the detailed description of the preferred embodiment in conjunction with the accompany drawings.

DETAILED DESCRIPTION OF THE PREFERRED EMBODIMENTS

Figure 1:
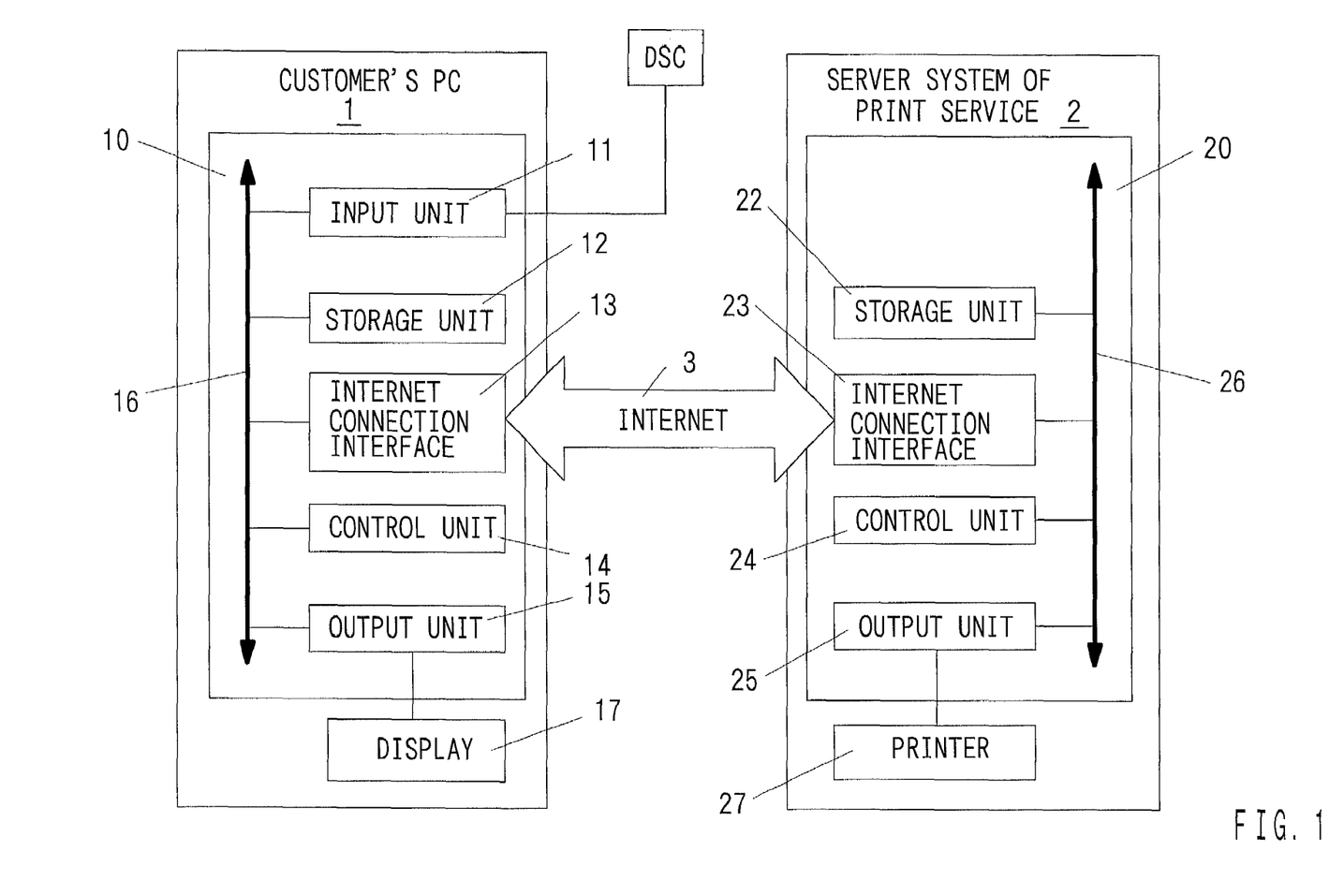
FIG. 1 is a block diagram showing a system of a first embodiment in accordance with the present invention.

FIG. 1 is a block diagram showing a system of a first embodiment in accordance with the present invention. A customer orders prints by transmitting digital image data of the prints to server computer system 2 (server system) of a print service laboratory from customer's personal computer PC 1 through the Internet 3. Personal computer PC 1 is used as a digital print ordering device, and server system 2 is used as a digital print making device.

Personal computer PC 1 comprises computer main body 10, display 17 and etc. The computer PC1 includes input unit 11 through which the computer PC1 receives digital image data(image data) from a digital still camera (DSC), storage unit 12 for storing the image data and various programs, Internet connection interface 13 through which personal computer PC 1 is connected to the Internet, control unit 14 for controlling the interface and the units to execute the programs, output unit 15, and data bus 16 that connects the units and the interface each other. Display 17 displays various screens by being coupled with output unit 15. This personal computer PC 1 is a common personal computer.

Alternatively, instead of using storage unit 12, an external recording device or an external digital image storage device may be used. Furthermore, instead of using the digital print ordering device, an image storage device that has communication means, a display, and data input means may be used.

Server system 2 comprises server computer 20 that includes Internet connection interface 23 through which personal computer PC 1 is connected to the Internet, storage unit 22 for storing the image data that is received through the Internet 3 and various programs, output unit 25 through which data is output, control unit 24 for controlling the interface and the units to execute the programs, and data bus 26 that connects the units and the interface each other. Server system 2 also comprises printer 27 that is coupled with output unit 25. Printer 27 makes a print based upon image data transmitted from server computer 20. For example, the printer 27 is an ink jet type printer or a digital photo-printer that produces an image of the digital image data by exposing a photosensitive paper.

The Internet 3 may be replaced by other communication means.

Figure 2:
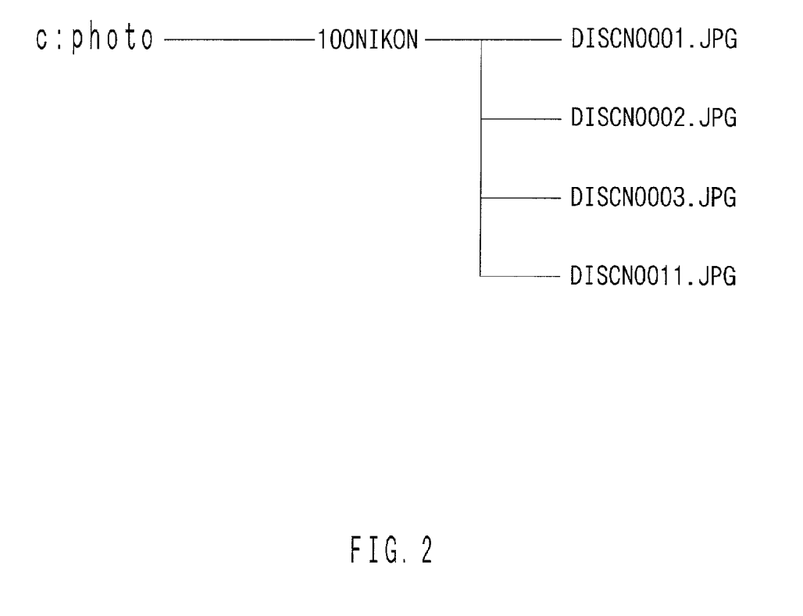
FIG. 2 is a view showing a directory structure of an image database for storing image data into a storage unit 12 in FIG. 1.

Customer's personal computer PC 1 stores image data of a plurality of digital images which is transmitted from the DSC. FIG. 2 is a view showing a directory structure of image database DB that is included in storage unit 12. Referring to FIG. 2, directory 100NIKON, located at c:¥photo¥100NIKON, includes three files of digital image data, i.e., DSCN0001.JPG, DSCN0002.JPG, and DSCN0003.JPG. Although image database DB includes tree-structured directories in FIG. 2, the directories are not necessarily formed in tree-structure in the present invention. A single directory such as a root directory may include all image files.

Figure 3:
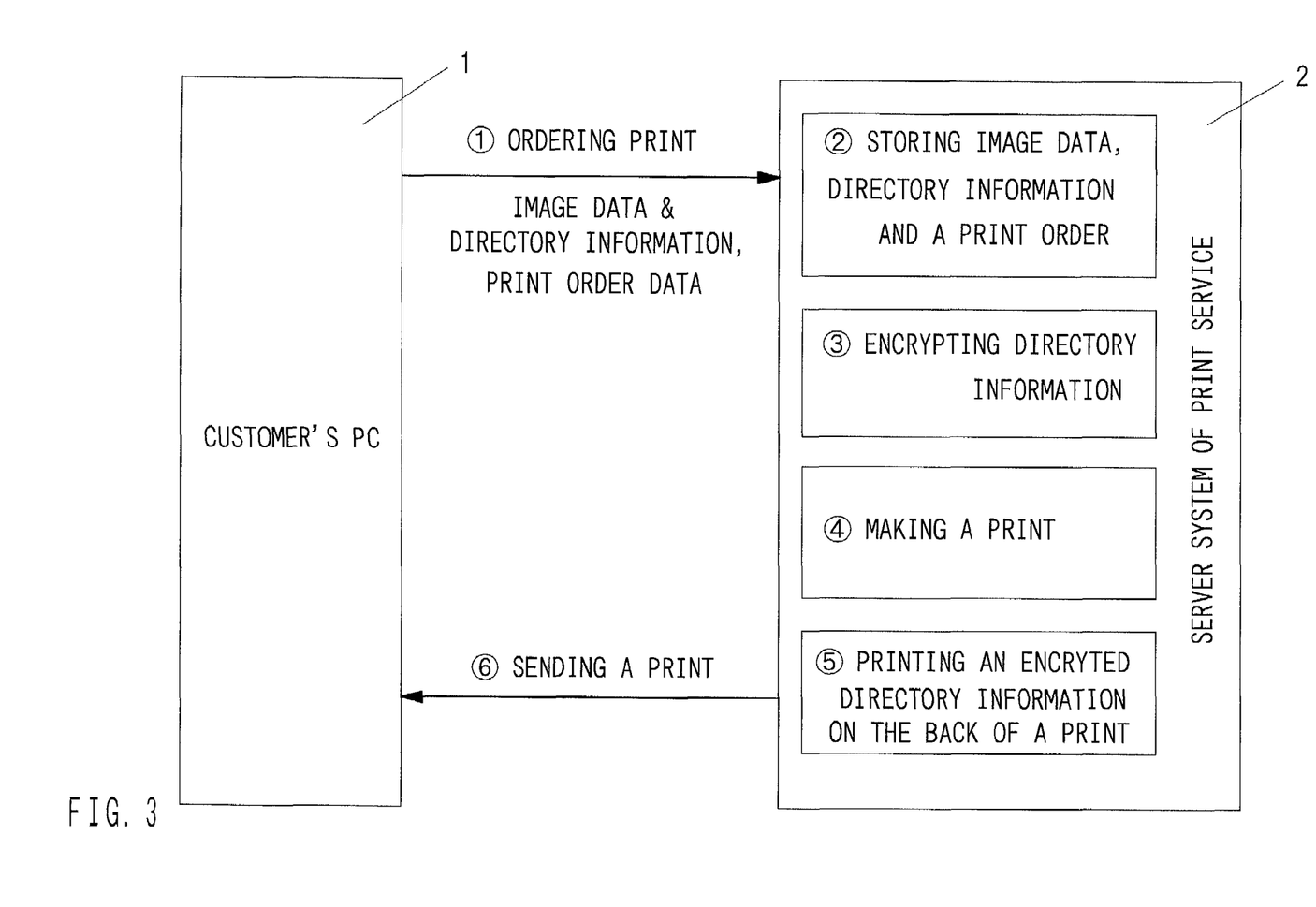
FIG. 3 is an explanatory view showing a print service process from ordering a print to receiving a print.

FIG. 3 is an explanatory view showing a print service process from ordering a print to receiving a print. A customer orders a print based upon an image database stored in personal computer PC1 and receives the print from the print service laboratory through the whole print service process.

A customer accesses sever computer 20 from personal computer PC 1 through the Internet 3 to order a print at a print service laboratory's web site. The customer transmits an image file such as DSCN0001.JPG and order data to the web site (①). When image data is transmitted, a file name of image data and location information of the file (i.e., a directory name) are designated on personal computer PC 1. More specifically, directory information c:¥photo¥100NIKON¥DSCN0001.JPG, which includes directory names and a file mane, is entered into image file designating box 41 on an image data transmitting screen in FIG. 4. Then, Send button 42 is pressed.

Figure 4:
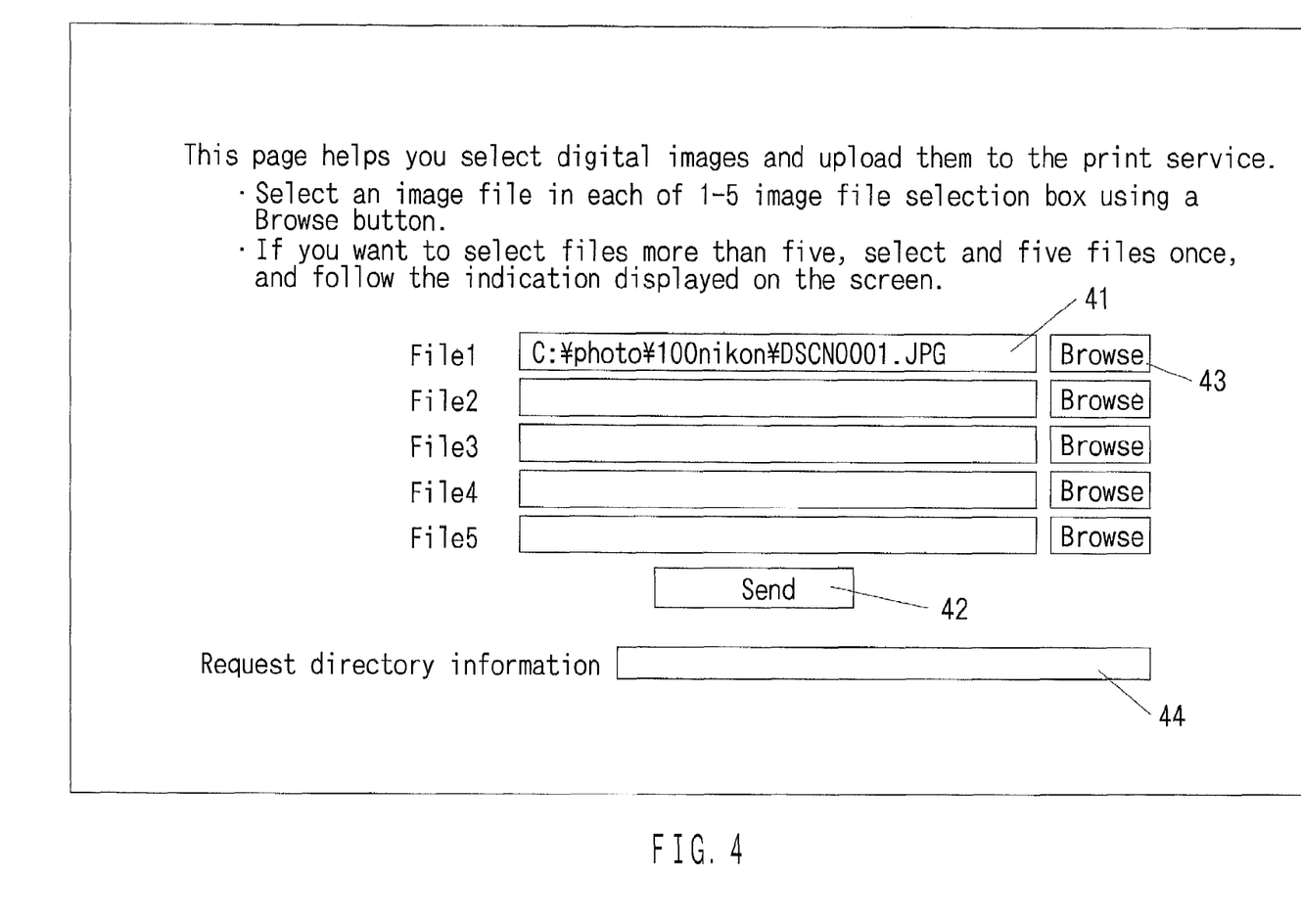
FIG. 4 is a view showing a image data transmitting screen in the process of FIG. 3.

If all image data files are stored in one directory or a root directory, entering of the directory name can be omitted, and the directory name can be designated automatically.

Figure 5:
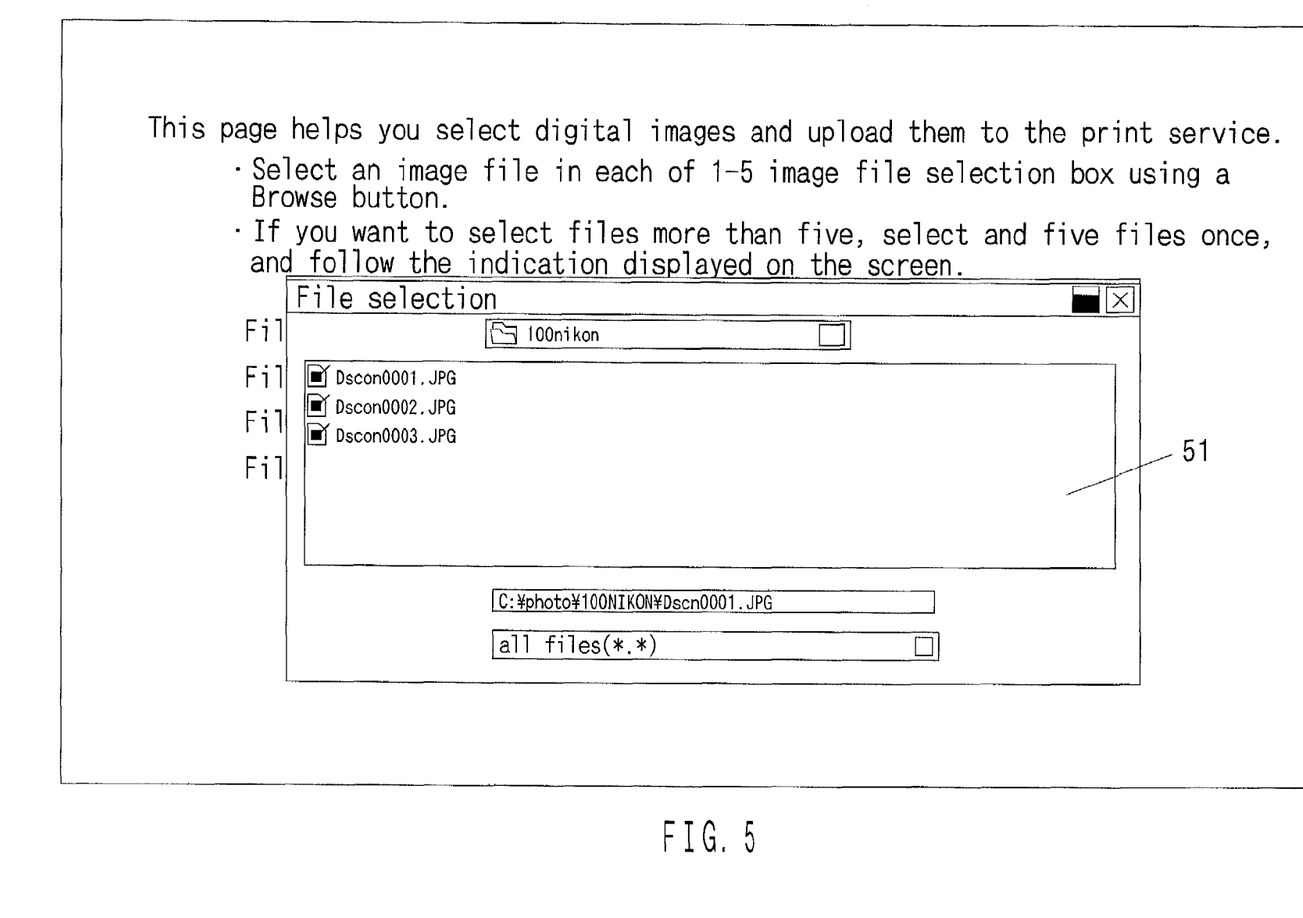
FIG. 5 is a view showing a selection screen for entering a file name into a on-screen box.

Personal computer PC 1 transmits the designated file name (DSCN0001.JPG), image data of the file, and the directory path name (c:¥photo¥100NIKON) in which the image data is stored, to computer 20. Alternatively, the image file can be selected using file selection window 51 in FIG. 5. File selection window 51 is opened by clicking Browse button 43.

Figure 6:
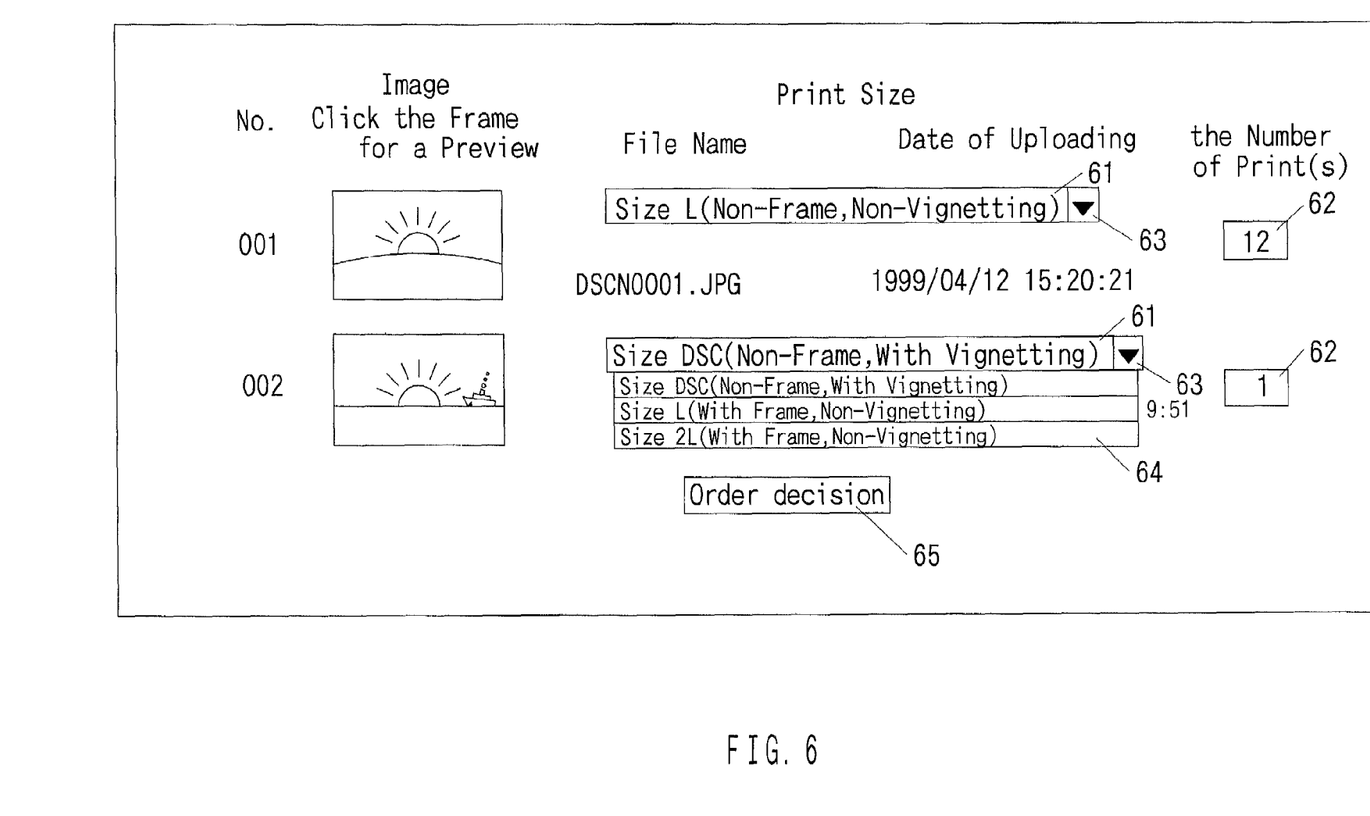
FIG. 6 is a view showing a screen for designating a print size and the number of prints in the process in FIG. 3.

Subsequent to the image data transmitting screen, a print ordering screen is opened as shown in FIG. 6. Referring to FIG. 6, a print size is selected in print size selecting box 61. By clicking ▼ button 63 at the right of print size selecting box 61, drop-down list 64 is displayed. The print size is selected by clicking one of print sizes indicated in drop-down list 64. The number of prints is selected in print number box 62. Press of order decision button 65 decides the selected print size and the selected number of prints.

Furthermore, ways of receiving prints and paying charges are selected and decided in the following screens. These decided print order data is transmitted to sever computer 20.

Server computer 20 receives the image data, the directory information, and the print order data, and stores them to storing unit 20 (②).

Server computer 20 executes an encryption program stored in storing unit 20 to encrypt the directory information (③). An adequate encryption method may be employed as the encrypting method used in the encryption program.

Then, server computer 20 transmits the image data, the print order data, and the encrypted directory information to printer 27. Printer 27 prints out prints of a designated size and the designated numbers based upon the image data and print order data (④).

The encrypted directory information is added at a predetermined location of the print (⑤). For example, the encrypted directory information is printed on the back of the print, or extra exposure is made to indicate the encrypted information in an area outside of a picture frame.

Completed prints are received by a customer in a designated way (⑥). The customer retains the prints in an adequate manner such as storage in an album.

When a customer wants to order an additional print after considerable time has passed, he sometimes forgets the directory information, i.e., the directory name and the file name of desired image data. This causes him to spend much time and effort to search the image data. In other possible case, a person who ordered an original print is not the same as a person who orders an additional print. The latter person does not know the directory information because the former person stored image data on personal computer PC 1.

Generally, in order to search image data surely in short time, it is necessary to set sure keywords such as a date of photograph, a date of storing image, and an image title. However, if a customer does not know these keywords, he cannot search the image data. In addition, assigning of an adequate keyword to each image requires much time and effort. Though a customer could search the image data using a searching function of personal computer PC 1, it is not sure way.

In accordance with the present invention, it is possible for a customer to search desired image data even if he forgets directory information of the image data.

Figure 7:
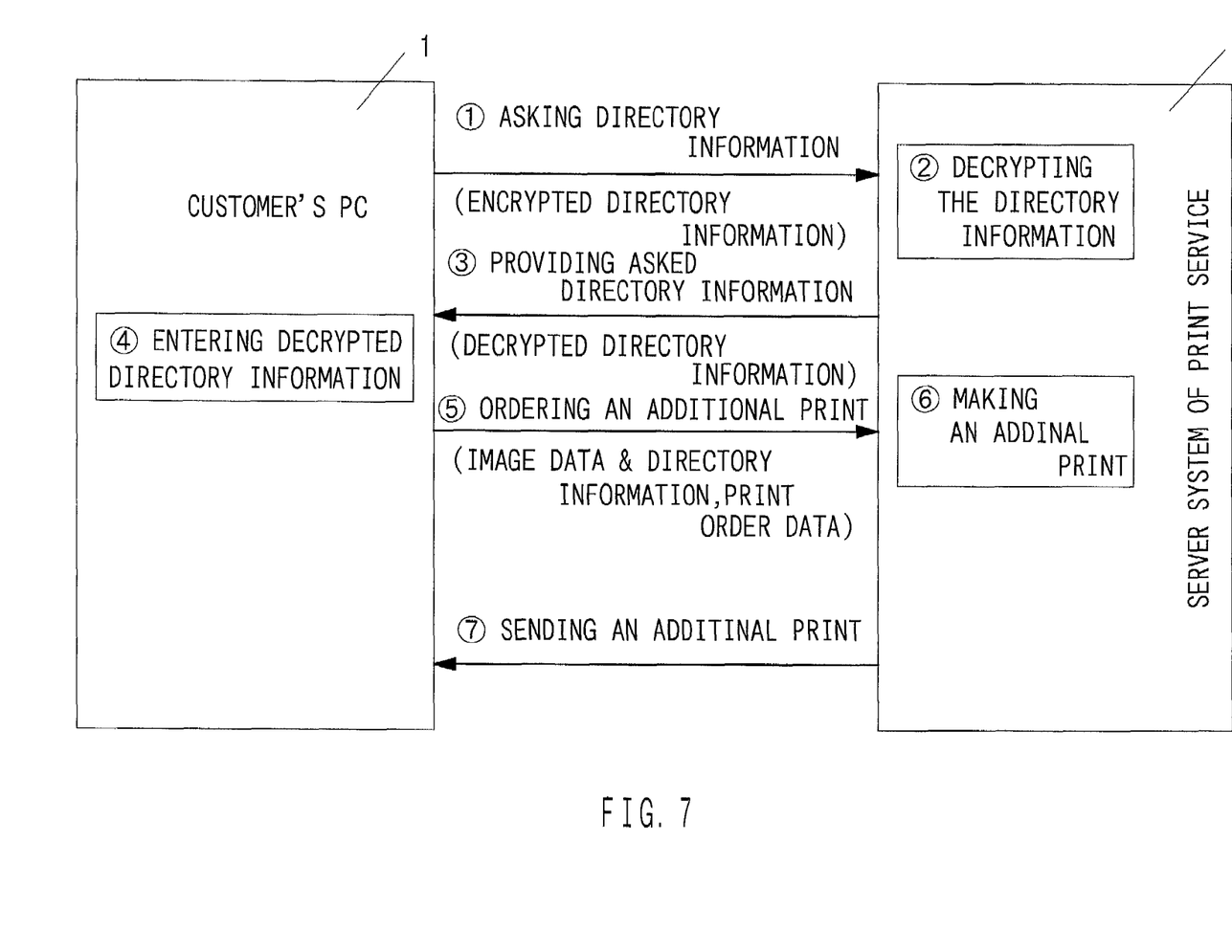
FIG. 7 is an explanatory view showing a process of making additional prints in the system in FIG. 1.

FIG. 7 is an explanatory view showing a print service process with regard to an additional print in the system in FIG. 1. Referring FIG. 7, a customer must transmit image data to a print service laboratory in order to order an additional print. However, he cannot search image data on the image data transmitting screen in FIG. 4 because he forgets the directory information of the image data. Then, he enters encrypted directory information, which is already printed on the back of a desired print, into directory information request box 44. This encrypted directory information is transmitted to server computer 20 (①).

Server computer 20 receives the encrypted directory information and decrypts it by using an encryption translation program stored in storage unit 22 (②), thereby restoring original directory information. Server computer 20 transmits this directory information to personal computer PC 1 (③). The transmitted directory information is entered into image file designating box 41 (④). The directory information can be entered automatically or manually.

Then, the customer transmits the image data and the directory information of the desired print to server computer 20 in the same manner as process ① in FIG. 3 (⑤). Server computer 20 prints out the additional print according to the processes between process ② and process ⑤ in FIG. 3 (⑥). Then the print service laboratory sends the completed additional print to the customer (⑦). Thus, even if directory information of a desired additional print is missing, print ordering and print making are easy.

The directory information is printed in the form of encrypted information on the back of a print, as described previously. However, if the directory information is printed without being encrypted, a customer does not need to ask the print service laboratory about the directory information. Then, a part of the print service process shown in FIG. 7 becomes unnecessary. Accordingly, by encrypting directory information in a particular manner, the print service laboratory can increase a chance to take an order of an additional print.

If a large majority of customers have bar code readers along with personal computers PC1, it is possible to indicate the directory information with the bar code.

There is a case where the image data is sometimes moved to another directory from the current directory. If the image data is moved to another directory, a customer cannot order a print or an additional print based upon the original file location. If he designates the original file location in FIG. 4 after the image data has been moved, an error message appears on the screen of personal computer PC 1.

Figure 8:
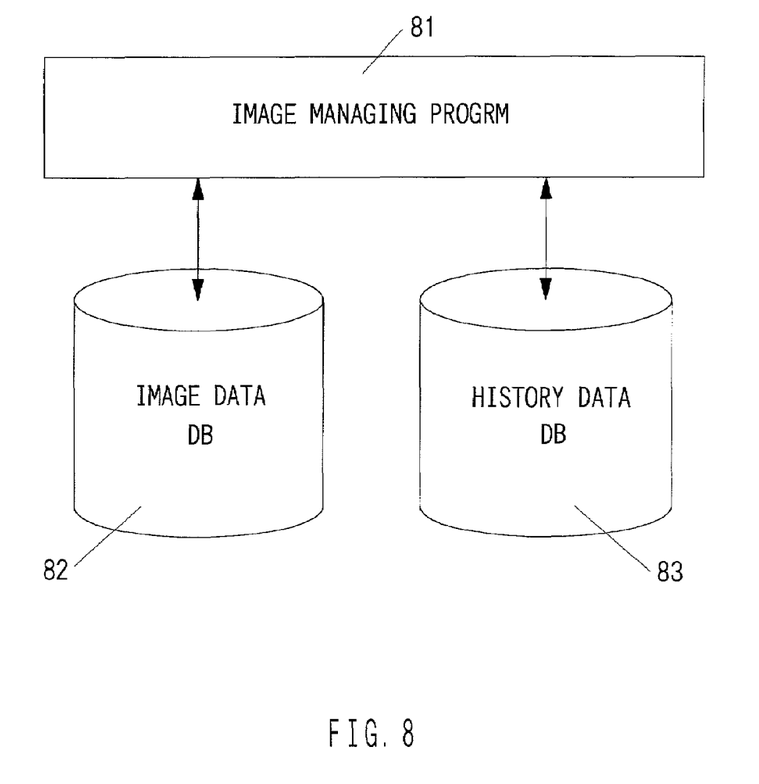
FIG. 8 is a view showing a configuration including image managing program and image databases of the present invention.

However, this disadvantage can be avoided by performing the following process. According to the process, it is easy to find image data to be used for making a print or ordering an additional print. FIG. 8 is a view showing a configuration including image managing program 81, image database (DB) 82, and history database (DB) 83. Image DB 82 and history DB 83 are contained in storage unit 12 of personal computer PC 1.

Image managing program 81 performs various operations such as capturing image data from an external device like a DSC, storing the captured image data into image DB 82, transmitting stored image data to an external device, moving stored image data to another directory, and storing histories of these operations into history DB 83. The histories of the operations are stored for each image data in history DB 83.

Figure 9A:
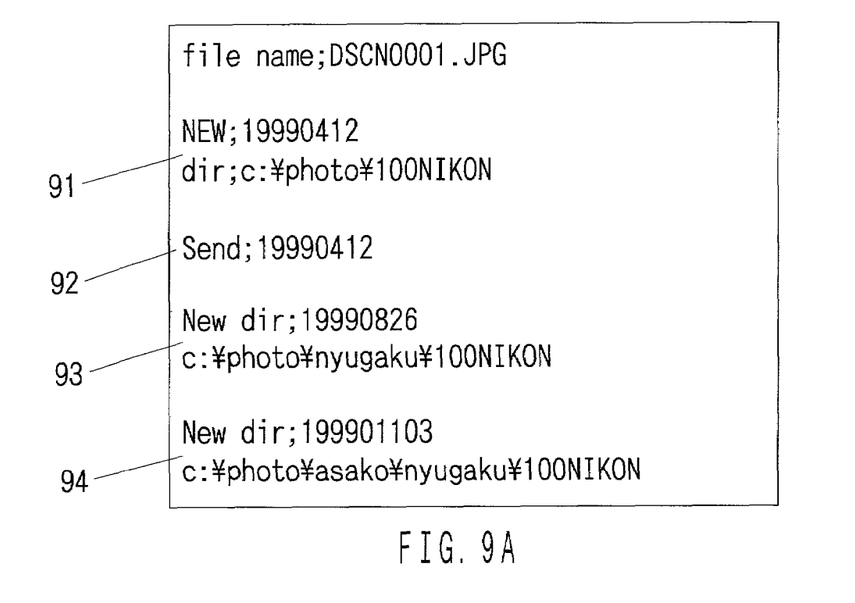
FIG. 9A is a view showing a content structure of a history database in FIG. 8.

FIG. 9A is view showing a content structure of history DB 83 in FIG. 8. FIG. 9B is view showing another content structure of history DB 83 in FIG. 8. FIG. 9A shows a history of image data of which file name is "DSCN0001.JPG". Referring to FIG. 9A, file DSCN0001.JPG is originally stored in directory "100NIKON", of which directory path is c:¥photo¥100NIKON, on Mar. 12, 1999 (91). File DSCN0001.JPG is sent to the outside on the same day (92). Then, directory "100NIKON" is moved to another location c:¥photo¥nyugaku¥100NIKON on Aug. 26, 1999 (93), and is further moved to a different location c:¥photo¥asako¥nyugaku¥100NIKON on Nov. 3, 1999 (94).

Figure 9B:
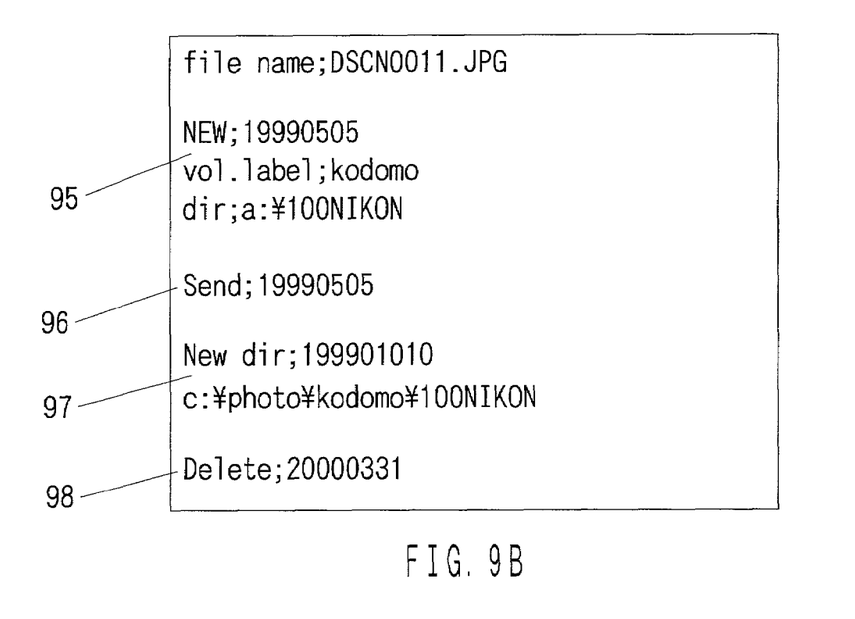
FIG. 9B is a view showing another content structure of a history database in FIG. 8.

FIG. 9B shows a history of image data of which file name is "DSCN0011.JPG". Referring to FIG. 9B, file DSCN0011.JPG is originally stored in directory 100NIKON, of which directory path is a:¥100NIKON, on May 5, 1999 (95). Directory 100NIKON is included in a medium of which volume label is "kodomo". File DSCN0011.JPG is sent to the outside on the same day (96). Then, directory 100NIKON is moved to another location c:¥photo¥kodomo¥100NIKON on Oct. 10, 1999 (97), and is eliminated on Mar. 31, 2000 (98).

In the case where a file name is changed, the change of the file name is recorded in history data DB 83. Image managing program 81 is started when a customer transmits image data to a print service laboratory for purpose of ordering an additional print (process ① in FIG. 3, process ④ in FIG. 7). If a designated image file exists in a designated directory, image managing program 81 reads out the file. If a designated image file does not exist in a designated directory, image managing program 81 finds the directory of the desired image data by using history DB 83. Directory information of the found directory is entered into image file designating box 41 in FIG. 4 and is transmitted to server computer 20. These processes are illustrated in FIG. 10.

The processes are in detail explained using a case of ordering an additional print of which image file is "DSC0001.JPG". This image file has the history shown in FIG. 9A. The first print of the image file has been printed on Mar. 12, 1999.

To order an additional print, a customer obtains directory information through processes ①–④ in FIG. 7 because he forgot or lost it. The obtained directory information "c:¥photo¥100NIKON¥DSCN0001.JPG" is entered into image file designating box 41. When Send button 42 is pressed, image managing program 81 starts.

Figure 10:
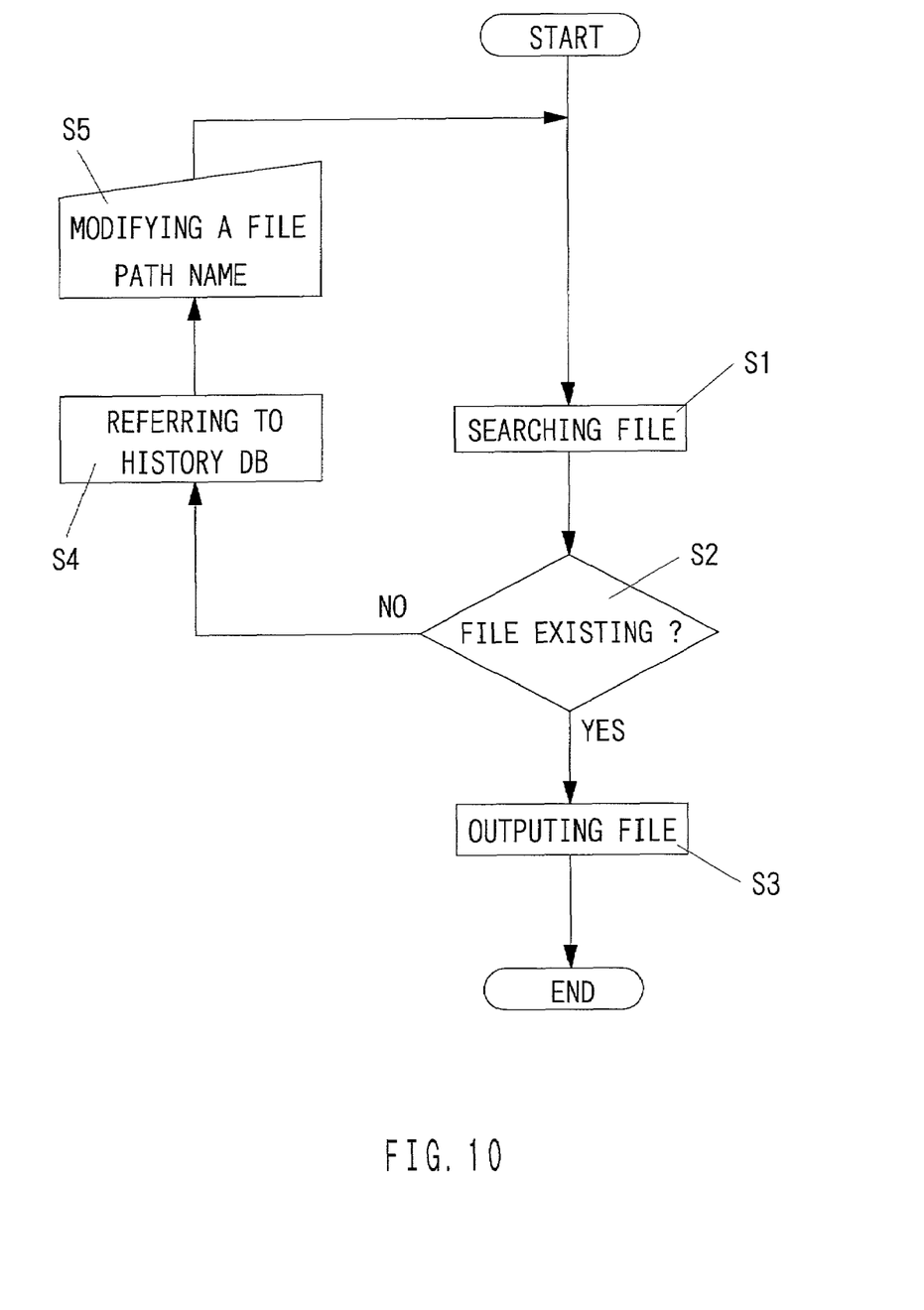
FIG. 10 is a flowchart showing a search process operated in the image data managing method of the present invention.

In step S1 in FIG. 10, image managing program 81 searches designated directory 100NIKON (c:¥photo¥100NIKON) in image DB 82. In step S2, it is determined whether designated file "DSCN0001.JPG" exists. If the additional print has been ordered before Aug. 26, 1999, the process advances to step S3 because the designated file exists in the designated directory. In step S3, the file is transmitted to server computer 20.

If the additional print has been ordered after Aug. 25, 1999, the process advances to step S4 because the designated file does not exist in the designated directory. In step S4, image managing program 81 finds a directory that includes image file DSCN0001.JPG by referring to the history of image file DSCN0001.JPG as shown in FIG. 9A. If the additional print has been ordered after Nov. 4, 1999, image managing program 81 finds directory 100NIKON (c:¥photo¥asako¥nyugaku¥100NIKON), and the process advances to step S5. In step S5, the data in image file designating box 41 is changed to c:¥photo¥asako¥nyugaku¥100NIKON¥DSCN0001.JPG, and the process returns back to step 1.

This time, since the designated file exists in the designated directory, the image data of the additional print is transferred to server computer 20.

In the case where a print has been printed after Aug. 26, 1999, directory information "c:¥photo¥nyugaku¥100NIKON" is entered into image file designating box 41. Then, image managing program 81 finds directory 100NIKON at c:¥photo¥asako¥nyugaku¥100NIKON in the same manner described above. The desired image file is stored in this directory There is a case where some image data has been already deleted from history database DB 83, as shown in FIG. 9B. In this case, indication of image data deletion is displayed on the screen.

Further, when history database DB 83 is referred to, other keyword such as the date of storage is preferably used together, so that a search error is avoidable.

Furthermore, in the case of using detachable media such as Compact Flash Memory and Smart Media as recording media, it is preferable that a volume label of these media (e.g., "kodomo" in FIG. 9B) be included as directory information. Likewise, it is preferable to include the volume label in FIGS. 3 and 7 upon using detachable media. However, when the directory information is automatically entered into image file selecting box 41, the volume label is removed from the directory information.

A second embodiment of the present invention will be explained. In the second embodiment, an encrypting program for encrypting directory information and an decrypting program for decrypting encrypted information are stored in storage unit 12 of personal computer PC 1.

Figure 11:
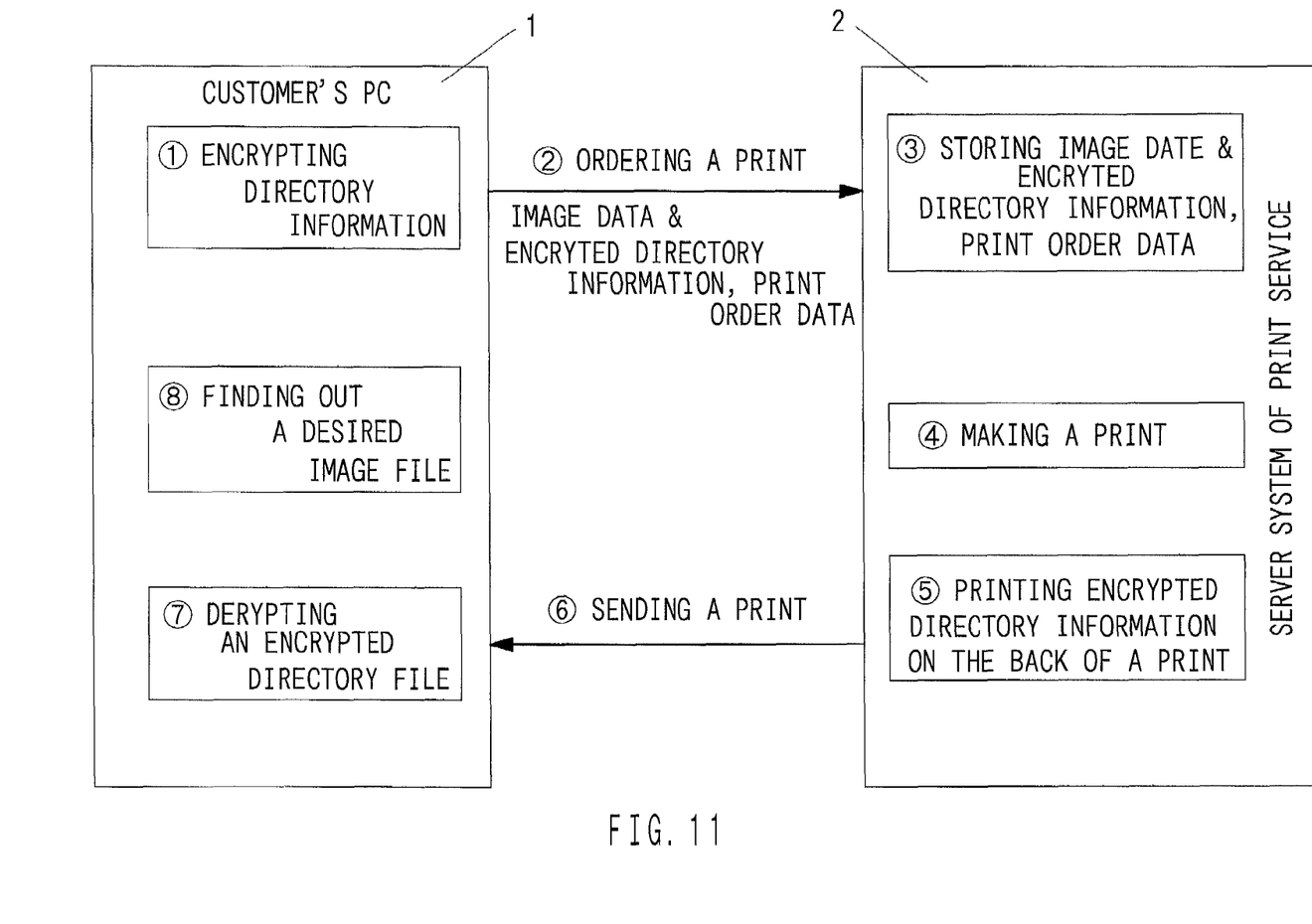
FIG. 11 is an explanatory view showing a process of making a print digitally in accordance with a second embodiment of the present invention.

Referring to FIG. 11, a process for ordering and making a print will be explained. When a customer enters directory information of desired image data into image file selecting box 41 and presses the Send button, an encryption program starts and encrypts the directory information including a directory name and a file name (①). Then personal computer PC 1 transmits the encrypted directory name and file name, designated image data, and order data to server computer 20 of server system 2 (②).

Server computer 20 stores received image data, the encrypted directory information, and the order data into storage unit 22 (③). Server computer 20 controls printer 27 to print a print (④), and then controls printer 27 to print encrypted directory information on the back of the print (⑤). Then, a completed print is provided to the customer (⑥). The customer views and enjoys the received print.

When a customer orders an additional print, if he forgets or looses the directory name or the file name, he enters the encrypted directory information, which is printed on the back of the print, into directory information request box 44, and presses the Send button. Then, encryption translation program starts and decrypts the encrypted directory program (⑦). The encryption translation program finds a desired image file in the directory based upon restored directory information and retrieves the image file from storage unit 12 (⑧). These processes ⑦ and ⑧ are implemented by personal computer PC 1. Following these processes, processes from ① to ⑥ are implemented to produce an additional print. The entire processes end by providing the additional print to the customer.

In the second embodiment, it is possible to avoid a problem with communication security because personal computer PC 1 does not transmit non-encrypted information to server computer 20.

A third embodiment of the present information will be explained. The third embodiment is similar to the first embodiment, and the difference between the first embodiment and the third embodiment is mainly explained. The feature of the third embodiment is that image data is retained by storage unit 22 of server computer 20 in a print service laboratory, not by customer's computer PC1. Although process ② in FIG. 3 in the first embodiment is performed to implement processes ③–⑤, similar process ③ in FIG. 11 in the present embodiment is performed to store image data.

In the third embodiment, encrypting information is not necessary because a print service laboratory retains image data and can necessarily receive a print order from a customer.

Figure 12:
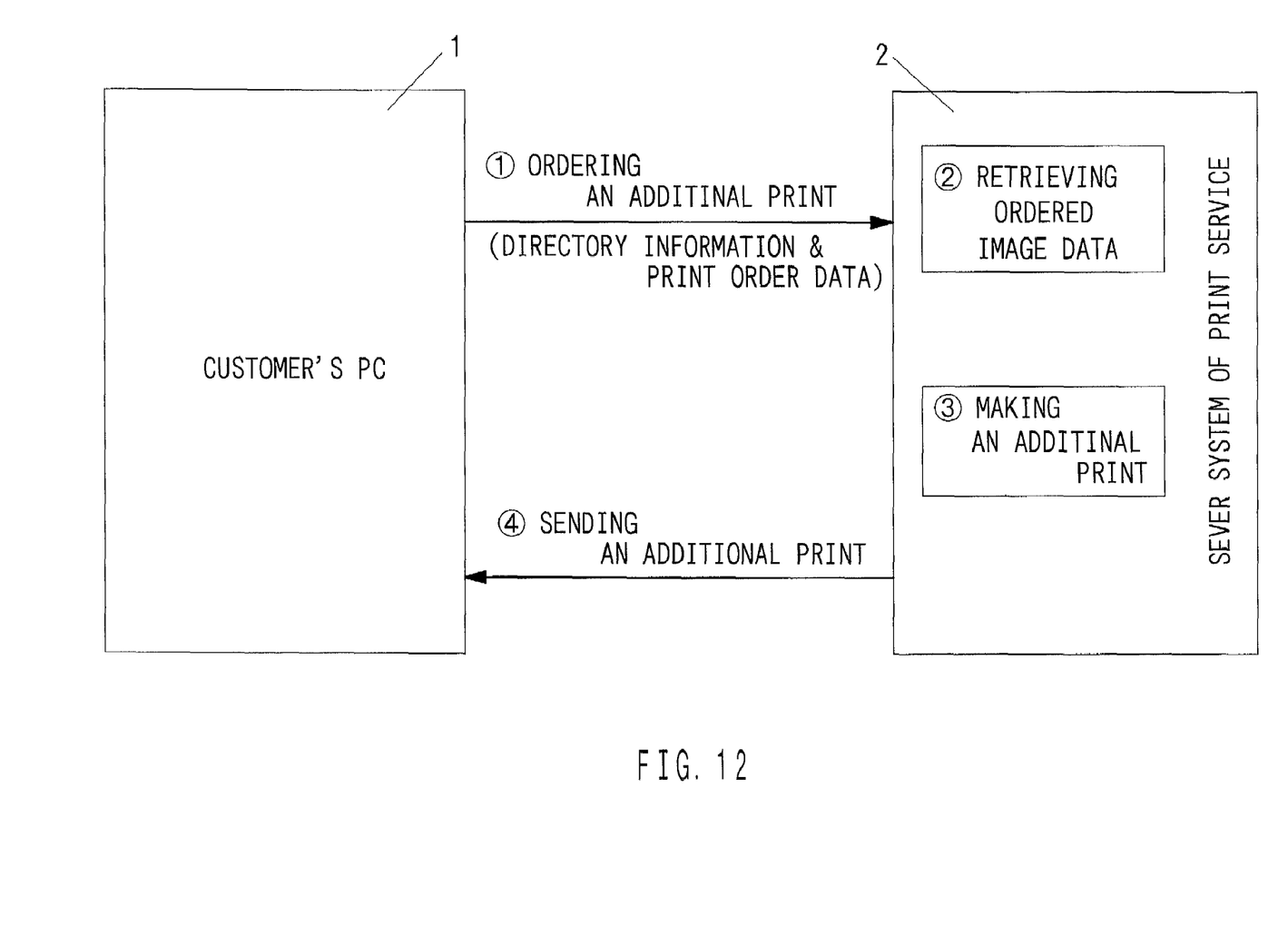
FIG. 12 is an explanatory view showing a simplified process of making additional prints.

As a result, a flow of processes in FIG. 7 in the first embodiment is simplified to a flow of processes in FIG. 12. Referring to FIG. 12, a customer transmits order data and directory information, which has been printed on the back of a print, to server system 2 (①).

Server system 2 retrieves designated image data from storage unit 22 based upon the received directory information (②), and transmits the retrieved image data, the order data and the directory information to printer 27. Then, printer 27 prints a print (③). The completed print is provided to the customer with a specific method (④).

In accordance with the third embodiment of the present invention, a print service laboratory retains image data, so that procedure for ordering a print is simplified.

Further, in the third embodiment, personal computer PC1 may be replaced by a digital image recording-device having a communication function, and the Internet 3 may be replaced by other communication means corresponding to the communication function. For example, personal computer PC1 may be replaced by a digital camera connected to a cellular phone and the Internet 3 may be replaced by a communication network for cellular phone.

Furthermore, it is also possible to use the image data managing method in the second embodiment and third embodiment.

There accordingly has been described a method and device for digitally ordering and making a print, and a method for managing digital data. In accordance with the present invention, even if a user forgets or looses a directory name or digital image file name, it is easy to find them based upon information printed on a print, and to order an additional print.

Further in the embodiments of the present embodiment, if printer 27 is such a printer that needs to receive image data for each processing of a print, server computer 20 transmits image data and directory information thereof for each processing of a print. In this case, when printer 27 makes a plurality of same prints, server computer 20 repeats a plurality of operations to transmit the same image data and the same directory information for each processing of a print.

Further, even if a directory that includes desired digital image data is changed and the directory is consequently missing, it is easy to retrieve the desired image data based upon stored directory information.

Furthermore, this method and device is also used for general digital data.

In accordance with embodiments of the present invention, image data of a print, directory information or encrypted directory information, and order data may be also stored into the detachable media, and these data and information may be transferred to server computer 20 through the detachable media, except for the case of the additional ordering in the first embodiment.

Further, although embodiments of the present invention have been described hereinabove, the present invention is not to limited to the digital image captured by a digital camera. The present invention is applicable to all digital images created by a personal computer. In this case, the personal computer serves as a digital image creating device. Furthermore, this invention may be used for a purpose other than a print ordering or an additional print ordering.

Further, it is also useful to indicate the directory information on a print when a print is printed in a home. In this case, printer 27 is coupled to output unit 15 of customer's computer PC1. Computer PC1 transmits image data and directory information thereof to printer 27. Printer 27 makes a print based upon the transmitted image data and prints the directory information on the print.

Furthermore, the data managing method in accordance with the present invention is not limited to managing digital image data. The present invention may be applicable to managing various types of digital data. Even if a directory having desired digital data is changed, it is easy to find the directory having desired image data based upon a history of the directory.

What is claimed is:

1. In a system for making a print of a digital image including a computer for storing a digital image data and a printing device for making the print of the digital image data, a method comprising the steps of:
   transmitting from the computer to the printing device the digital image data along with information indicative of a location of the digital image data in the computer, wherein the computer is of a customer making an order for the print of the digital image;
   making at the printing device the print in response to the order from the computer based on the transmitted digital image data;
   encrypting the transmitted information indicative of the location of the digital image data in the computer;
   adding to the print at the printing device the encrypted information indicative of the location of the digital image data in the computer;
   delivering the print to the customer;
   transmitting from the computer to the printing device the encrypted information added to the delivered print;
   decrypting the encrypted information at the printing device; and
   transmitting from the printing device to the computer the decrypted information,
   whereby the customer with the decrypted information can easily locate the digital image data in the computer to make an order for a further print of the digital image.

2. A method in accordance with claim 1, wherein the computer includes a file system with directory information, and wherein the information includes specific directory information related to the transmitted digital image data.

3. A method in accordance with claim 1, wherein the digital image data and the information are transmitted from the computer to the printing device through a telecommunication system upon placement of the order.

4. In a system for making a print of a digital image including a computer for storing a digital image data and a printing device for making the print of the digital image data, a method comprising the steps of:
   transmitting from the computer to the printing device the digital image data along with information indicative of a location of the digital image data in the computer;
   making at the printing device the print based on the transmitted digital image data;
   adding to the print at the printing device the transmitted information indicative of the location of the digital image data in the computer;

a step of storing the digital image data at a location of a first database in the computer;

a step of recording in a second database in the computer data linking a previous storage location of the digital image data to a current storage location of the digital image data when the storage location of the digital image data in the first database is changed;

a step of designating the location of the digital image data in the first database;

a step of consulting the second database for determining the current location of the digital image data in the first database when the digital image data is not located in the designated location that was designated in the step of designating; and a step of locating the digital image data in the first database in response to the step of consulting, wherein the located digital image data and the current location of the digital image data are transmitted in the step of transmitting.

5. A printing device for making a print of a digital image comprising:

a first receiver that receives from an external device an order including a digital image data and information indicative of a location where the digital image data is stored;

an encrypting unit for encrypting the information;

a printer that makes the print of the digital image data;

an adder that adds the encrypted information to the print;

a deliverer that delivers the ordered print;

a second receiver that receives a query that includes the encrypted information previously added to the delivered print;

a decrypting unit that decrypts the encrypted information in the query; and a transmitter that transmits to the external device the decrypted information, whereby a further order from the external device through the first receiver is facilitated.

6. A computer of a customer for making an order for a print of a digital image data comprising:

a storage for storing the digital image data;

a first output for transmitting to an external device an order including the digital image data and an information indicative of a location of the digital image data in the storage;

a second output for transmitting to the external device an encrypted information indicative of a location added to a print for requesting decryption of the encrypted information; and a receiver for receiving decrypted information from the external device based on the request for decryption that was transmitted to the external device.

7. A computer of a customer for making an order for a print of a digital image data comprising:

a storage for storing the digital image data;

a first output for transmitting to an external device an order including the digital image data and an information indicative of a location of the digital image data in the storage;

an encrypting unit for encrypting the information indicative of the location of the digital image data in the storage; and a second output for transmitting to the external device the encrypted information indicative of the location of the digital image data in the storage.

8. A method of managing digital data comprising:

a first step of storing a digital data at a location of a first database;

a second step of recording in a second database data linking a previous storage location of the digital image data to a current storage location of the digital image data when the storage location of the digital image data in the first database is changed;

a third step of designating the location of the digital data in the first database;

a fourth step of consulting the second database for determining the current location of the digital data in the first database when the digital image data is not located in the designated location that was designated in the third step; and a fifth step of locating the digital data in the first database in response to the fourth step.

9. A method according to claim 8 further comprising:

a sixth step of trying to locate the digital data in the first database in response to the third step; and a seventh step of performing the fourth and fifth steps when the sixth step fails to locate the digital data because of the change in the location in the first database, wherein the fourth and fifth steps are not performed when the sixth step is successful.

10. A method according to claim 9, wherein the digital data is digital image data.

11. A computer readable recording medium for storing a program for managing digital data to be used in a computer, the program comprising instructions to perform:

a first step of storing a digital data at a location of a first database;

a second step of recording in a second database data linking a previous storage location of the digital image data to a current storage location of the digital image data when the storage location of the digital image data in the first database is changed;

a third step of designating the location of the digital data in the first database;

a fourth step of consulting the second data base for determining the current location of the digital data in the first database when the digital image data is not located in the designated location that was designated in the third step;

a fifth step of locating the digital data in the first database in response to the fourth step;

a sixth step of trying to locate the digital data in the first database in response to the third step; and a seventh step of performing the fourth and fifth steps when the sixth step fails to locate the digital data because of the change in the location in the first database, wherein the fourth and fifth steps are not performed when the sixth step is successful.

* * * * *